3,801,534
ANTI-FOULING COATING COMPOSITION
Ronald W. Beers, Spring, Tex., assignor to Esso Research and Engineering Company
No Drawing. Filed Nov. 24, 1969, Ser. No. 879,561
Int. Cl. C08g 51/04; C09d 5/14
U.S. Cl. 260—37 EP
13 Claims

ABSTRACT OF THE DISCLOSURE

Effective marine antifouling coatings are secured by admixing an epoxy resin/curing agent vehicle with zinc, zinc oxides or mixtures thereof in combination with an organotin or organoarsenic toxicant. The coating composition may be employed as a solvent or solventless system. The preferred coating system is made up of an epoxy resin/polyamide vehicle admixed with zinc dust and 10,10'-oxybisphenoxarsine, tri-n-butyltin fluoride or mixtures thereof. Desirably, the zinc reagent and the organoarsenic and/or organotin antifoulant makes up from 55 to 75 volume percent of the total vehicle, zinc reagent and organometallic antifoulant composition.

BACKGROUND OF THE INVENTION

(I) Field of the invention

This invention relates to improved epoxy resin based marine antifouling coatings. More particularly, this invention relates to improved epoxy resin based marine antifouling coatings that contain a zinc reagent in combination with organoarsenic or organotin toxicants as active ingredients.

(II) Description of the prior art

The difficulties encountered due to marine fouling is well documented in the literature. Slow moving and stationary surfaces, in particular metal, concrete and wood surfaces, that are exposed to marine environments become fouled because of the presence of various marine organisms including algae, anomia, barnacles, bugula, encrusting byrozoans, hydroids, oysters, sponge, tube worms, tunicates, etc. Numerous techniques have been devised to prevent or retard the rate of fouling of surfaces exposed to marine environments. One of the most popular techniques used to retard the rate of fouling is to coat the articles subjected to the marine environment with a paint or coating containing certain active ingredients such as cuprous oxide, organotin compounds, organoarsenic compounds, halogenated, particularly chlorinated hydrocarbons, etc. While various types of coating compositions based on organoarsenic compounds (see: U.S. Pats. 3,228,830; 3,069,252; 3,337,352; 3,214,281, and 3,041,188) and organotin compounds (see: U.S. Pats. 3,426,473; 3,236,793; 3,214,279; 3,211,680, and 3,081,175) have been proposed, it has been found that the coatings, while effective for limited periods of time, do not possess the desired combination or mechanical and antifouling properties necessary to secure long-term antifouling protection against the entire spectrum of marine organisms.

SUMMARY OF THE INVENTION

In accordance with the present invention, it has been found that effective long-term antifouling protection can be secured with epoxy resin based coating systems that contain a zinc reagent in admixture with an organoarsenic or organotin toxicant composition. It has been found that the most efficient results are secured when the ratio of zinc reagent to organotin and/or organoarsenic toxicant is maintained within certain limits. The subject coating compositions can be employed in a solvent or in a solvent-free system.

The vehicle of the instant coating compositions is composed of an epoxy resin, that is an organic polymeric material characterized by the presence of two or more epoxy groups, in combination with a curing agent. Preferably, the epoxy resin composition is of the type formed by the reaction of epichlorohydrin with a polyol, such as 4,4'-isopropylidenediphenol (bis-phenol A). However, other types of epoxy resins such as materials formed through the epoxidation of butadiene polymers or resins prepared from an intermediate formed by the Diels-Alder condensation of butadiene and acrolein or of butadiene and crotonaldehyde may also be employed. Preferably the epoxy resins used as the coating vehicle are normally liquid compounds or low molecular weight solid compositions that are soluble in oxygenated aliphatic solvents such as ketones, esters, and ether alcohols or aromatic solvents such as xylene. The epoxy resin compositions desirably have molecular weights varying from about 340 to less than 8,000, preferably between about 340 and 3,000.

The second component of the coating system vehicle is an amine-type curing agent for the base epoxy resin. Useful amine-type curing agents include aliphatic and aromatic amines, in particular tertiary amines, $C_2$–$C_{30}$, preferably $C_2$–$C_{10}$ polyamines, polyamides, and amine adducts. The preferred curing agents are $C_2$–$C_{10}$ polyamines that contain two or more reactive hydrogen groups and amine terminated polyamide compositions, such as those formed through the condensation of unsaturated fatty acids with $C_2$–$C_{10}$ aliphatic polyamines having at least three amino groups per molecule. Representative examples of useful amine-type curing agents include triethylene tetramine, m-phenylenediamine, 3-diethylamino-1-propylamine, condensates of unsaturated fatty acids with diethylene triamine or triethylene tetramine (sold as Versamid 100, 115 and 125 resins), 3-isopropylamino propylamine, 1,3-diamino propane, 1,2-diamino propane, ethylene diamine, m-xylylene diamine, 3,3'-iminobispropylamine, tetraethylene pentamine, etc.

Sufficient amounts of the amine-type curing agent are employed to assure substantial crosslinking of the epoxide resin constituents of the vehicle. Generally stoichiometric amounts or slight excess of the amine curing agent are employed. Polyamide curing agents are normally used in amounts varying from 40 to 75 wt. percent based upon epoxy resin. While the basic constituents of the coating vehicle are the epoxy resin and the amine-type curing agent, other additives, which act as accelerators, diluents, fillers and modifiers may also be included in the vehicle formulation to modulate and optimize the final properties of the coating for any given specific application.

The principal active ingredients of the coating composition are a zinc reagent in combination with an organotin and/or an organoarsenic toxicant. The zinc reagent is either zinc dust or finely-divided zinc oxide. Preferably, the average particle size diameter of the zinc dust does not exceed about 15 microns. The zinc oxide desirably has an average particle size diameter ranging from about 0.2 to 2.0, preferably .5 to 1.0 micron. The zinc reagent, in addition to providing synergistic antifouling protection along with the organic toxicant, also supplies a certain level of galvanic protection when the coating is employed on ferrous surfaces. For most applications, zinc dust is the preferred zinc reagent.

The arsenic and tin organometallic toxicants can be used alone or in combination with each other in the antifouling coating system. The preferred organotin toxicants possess the general formula: $(R)_3SnX$ and $[(R)_3Sn]_2Y$. In each of the above formulas, R may be the same or different monovalent organic moiety and is preferably a monovalent alkyl radical having from 1 to 8, preferably 2 to 4 carbon atoms, e.g. ethyl, propyl, n-butyl, cyclohexyl, t-butyl, etc.; a phenyl radical; and a monovalent aralkyl radical having from 7 to 12 carbon atoms, for example, benzyl, methylbenzyl, 3-phenylpropyl, 2-methyl-3-ethylbenzyl, etc. The symbol X designates a halogen atom such as chlorine, fluorine, or bromine atoms, preferably a fluorine atom; a hydroxyl radical; an ether radical having the formula —OR; a hydrogen radical; a nitrate radical; and an organic ester radical having the general formula: $R_1COO$— wherein $R_1$ is a $C_1$ to $C_{20}$, preferably a $C_1$ to $C_{12}$ monovalent alkyl, aryl, alkylaryl, aralkyl or alkenyl radical, e.g. acetate, octanoate, laurate, naphthenate, benzoate, ethylbenzoate, acrylate, methacrylate, etc. The symbol Y designates an oxygen atom, a sulfur atom or a lower aliphatic or aromatic diester function having the general formula: —$OOCR_2COO$— wherein $R_2$ is a phenylene radical or a saturated or unsaturated straight, branched or cyclic alkylene radical having from 2 to 10 carbon atoms. The compositions wherein Y designates a diester function are formed by reacting bis(triorganotin) oxide with dicarboxylic acids such as terephthalic acid, oxalic acid, malonic acid, succinic acid, adipic acid, suberic acid, azelaic acid, 2,4-diethyladipic acid, etc.

Representative, nonlimiting examples of useful organotin compounds that may be employed as the toxicant in the instant antifouling compositions include bis(trihexyltin) oxalate, bis(tributyltin)malonate, bis(tributyltin)adipate, bis(triphenyltin)sebacate, bis(triethyltin) terephthalate, bis(ethyldipropyltin) oxide, bistributyltin) oxide, bis(tributyltin) sulfide, tripropyltin chloride, bis(triamyltin) oxide, triisobutyltin chloride, tributyltin acetate, tributyltin bromide, triphenyltin chloride, tributyltin laurate, tributyltin fluoride, trihexyltin maleate, amyl diethyltin chloride, tributyltin hydride, tributyltin naphthenate, triisopropyltin methoxide, etc. The preferred tin composition is tri-n-butyl tin fluoride.

Various types of organoarsenic compositions can also be employed as the toxicant in the antifouling coating composition. The preferred organoarsenic compositions are 10-phenoxarsine compounds, 5-hydro-10-substituted phenarsazines and triphenarsazine chloride. The subject 10-phenoxarsine compounds poessess the general formulae:

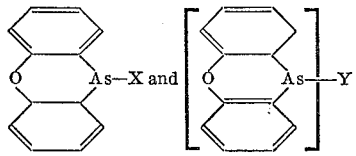

wherein X designates a halogen atom, e.g. chlorine, bromine or iodine atoms; a thiocyanato (—SCN) radical; a $C_1$ to $C_6$ alkyl radical, e.g. methyl, ethyl, butyl, amyl; or a phenyl radical and Y designates an oxygen or sulfur atom. Examples of useful compounds include 10-chlorophenoxarsine, 10,10'-thiobisphenoxarsine, 10-thiocyanatophenoxarsine, 10,10'-oxybisphenoxarsine, 10-bromophenoxarsine, 10-phenylphenoxarsine, 10-propylphenoxarsine, 10-amylphenoxarsine, etc.

The 5-hydro-10-substituted phenarsazine compounds possess the general formula:

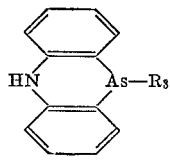

wherein $R_3$ is a cyanide radical, a thiocyanato radical, a $C_1$ to $C_4$ monovalent alkoxy radical, e.g. methoxy, propoxy, etc., a dimethyl thiocarbamoyl radical; an ethylxanthogenyl radical; a $C_1$ to $C_4$ monovalent thioalkenyl radical, for example, thiomethyl, thioethyl, thiopropyl, etc.; or a halogen atom, in particular chlorine, bromine or iodine atoms. Representative examples of useful compositions include 5-hydro-10-fluorophenarsazine, 5 - hydro - 10-chlorophenarsazine, 5-hydro-10-cyanophenarsazine, 5 - hydro - 10 - thiocyanatophenarsazine, 5-hydro-10 - methoxyphenarsazine, 5 - hydro-10 - ethylxanthogenylphenarsazine, etc. The preferred organoarsenic compositions are the 10-phenoxarsine compounds, in particular 10,10'-oxybisphenoxarsine.

The ratio of tin and/or arsenic organometal toxicant to zinc reagent is critical to securing long term antifouling protection. Preferably, the volume ratio of organometal toxicant to zinc reagent in the coating system is less than about 1.4 and preferably varies in the range of from 0.75 to 1.4, most preferably between about 0.8 and 1.0. Desirably, the concentration of organometal toxicant and zinc reagent to total vehicle, zinc reagent and organometal toxicant is maintained between about 55–75 volume percent, preferably about 65 volume percent.

As noted earlier, the instant coating compositions can be used in a solvent or solvent-free system. When solvents are employed, the solyvent system is normally composed of a mixture of oxygenated aliphatic materials such as ketones, esters and ether alcohols in combination with aromatic hydrocarbon materials such as xylenes. The paint-like compositions of the invention are applied by brushing, spraying, rolling or other suitable techniques to form the desired coating for surfaces exposed to fouling environments. The present epoxy resin based systems are particularly suitable as coatings for steel surfaces, in particular the underwater surfaces of marine vessels.

DESCRIPTION OF THE PREFERRED EMBODIMENTS

The invention will be more readily understood by reference to the following examples.

A series of epoxy resin based coating compositions were prepared (Table I) containing zinc dust in combination with either tributyltin fluoride or 10,10'-oxybisphenoxarsine.

TABLE I

| | Run | | | | |
|---|---|---|---|---|---|
| | 1 | 2 | 3 | 4 | 5 |
| Part A: | | | | | |
| Epoxy resin [a] | 104.3 | 104.3 | 104.3 | 104.3 | 104.3 |
| Methyl isobutyl ketone (MIBK) | 96.9 | 96.9 | 96.9 | 96.9 | 96.9 |
| Ethylene glycol monoethyl ether | 99.9 | 99.9 | 99.9 | 99.9 | 99.8 |
| Aromatic solvent | 44.2 | 44.2 | 44.2 | 44.2 | 44.2 |
| Clay gelling agent | 19.6 | 19.6 | 19.6 | 19.6 | 19.6 |
| Ethanol [b] | 9.8 | 9.8 | 9.8 | 9.8 | 9.8 |
| Zinc dust [c] | 1,960 | 1,170 | 800 | 1,170 | 800 |
| Part B: | | | | | |
| Polyamide curing agent [d] | 81 | 81 | 81 | 81 | 81 |
| MIBK | 9.3 | 9.3 | 9.3 | 9.3 | 9.3 |
| Ethylene glycol monoethyl ether | 9.5 | 9.5 | 9.5 | 9.5 | 9.5 |
| Aromatic solvent | 4.2 | 4.2 | 4.2 | 4.2 | 4.2 |
| Tributyl tin fluoride | | 156 | 130 | | |
| 10,10'-oxybisphenoxarsine | | | | 176 | 145 |
| Xylene | | 50 | 40 | 30 | 30 |
| Volume ratio toxicant/zinc dust | 0.00 | 0.78 | 0.95 | 0.75 | 0.90 |

[a] 75 wt. percent epoxy resin in xylene; epoxy resin (epichlorohydrin/Bisphenol A product) having molecular weight of 900.
[b] 95 wt. percent ethanol-water solution.
[c] Particle size of Zn dust about 8 microns.
[d] Condensation product of unsaturated fatty acid with tetraethylene pentamine in a 1/1 mole ratio dissolved in xylene to give a 70 percent solution by weight.

The individual compositions were prepared by adding the epoxy resin to the solvents of part A and then adding the gelling agent with stirring until the desired viscosity was obtained. Thereafter the zinc dust was introduced with further stirring. The part A mixture and part B mixture were thereafter admixed together 30 minutes prior to application. The pot life of the mixture was longer than about 8 hours. About 1% of colodial silica based on the Zinc Dust may be added to part A to improve package stability.

The efficacy of the various coating compositions was determined by applying the coating mixture to both sides of sand blasted 8" x 10" by ⅛" steel panels. Two coats of the material were applied for a total film thickness of about 4 mils. No undercoating was employed. The panels were then exposed to fouling conditions by submerging them in the sea at Miami, Fla. Each paint composition was used on two different panels and both sides of each panel were evaluated each month for eight months for overall antifouling performance. Each side of the test panel was given a numerical performance rating which was the average of the fouling resistance film value. The film value was 100 in all instances where the test surface had no physical defects. In the presence of defects, the film value was 100 minus the percent of the test panel surface effected by film defects. A film value of 100 was given to a test surface that was completely free of fouling. In every instance where incipient fouling was present, a rating of 95 was given. If mature forms of fouling were found on the test surface, the rating given was obtained by subtracting from 95 the actual number of individual anomia, barnacles, bugula, encrusting byrozoans, hydroids, oysters, sponge, tube worms or tunicates actually present minus the percent of the panel's surface covered by colonial forms, e.g. algae. The results of the 8-month test period are set forth in Table II below.

TABLE II

| Run | Month | | | | | | | |
|---|---|---|---|---|---|---|---|---|
| | 1 | 2 | 3 | 4 | 5 | 6 | 7 | 8 |
| 1–Front (F) | 69 | 82 | 0 | 0 | (1) | (1) | (1) | (1) |
| 1–Back (B) | 71 | 62 | 0 | 0 | (1) | (1) | (1) | (1) |
| 1A–F | 39 | 27 | 0 | 0 | (1) | (1) | (1) | (1) |
| 1A–B | 94 | 77 | 0 | 0 | (1) | (1) | (1) | (1) |
| 2–F | 100 | 100 | 95 | 93 | 88 | 89 | 86 | 66 |
| 2–B | 100 | 100 | 95 | 94 | 93 | 93 | 92 | 82 |
| 2A–F | 100 | 100 | 100 | 94 | 89 | 85 | 83 | 81 |
| 2A–B | 100 | 100 | 100 | 92 | 92 | 92 | 92 | 90 |
| 3–F | 100 | 100 | 100 | 100 | 100 | 100 | 100 | 100 |
| 3–B | 100 | 100 | 100 | 100 | 100 | 100 | 100 | 100 |
| 3A–F | 100 | 100 | 100 | 100 | 100 | 100 | 100 | 100 |
| 3A–B | 100 | 100 | 100 | 100 | 100 | 100 | 100 | 100 |
| 4–F | 100 | 100 | 92 | 85 | 73 | 68 | 66 | 65 |
| 4–B | 100 | 100 | 90 | 59 | 42 | 33 | 33 | 17 |
| 4A–F | 100 | 100 | 95 | 81 | 68 | 63 | 61 | 61 |
| 4A–B | 100 | 100 | 100 | 87 | 59 | 49 | 49 | 55 |
| 5–F | 100 | 100 | 100 | 100 | 100 | 100 | 100 | 100 |
| 5–B | 100 | 100 | 100 | 100 | 100 | 100 | 100 | 100 |
| 5A–F | 100 | 100 | 100 | 100 | 100 | 100 | 100 | 100 |
| 5A–B | 100 | 100 | 100 | 100 | 100 | 100 | 100 | 100 |

1 Removed.

As can be seen from the data set forth in Table II above, all of the antifouling coating compositions were markedly superior to the control composition (run 1) that contained only zinc dust and no organometal toxicants. A long term rating of 70–85 is considered acceptable. The data also shows that the coating systems of runs 3 and 5 were superior to the paints of runs 2 and 4. This fact is surprising since the compositions of runs 2 and 4 contained more organometal toxicant than the run 3 and 5 compositions. Further, the run 3 and 5 compositions possess a volume ratio of organometal toxicant to zinc dust well within the preferred critical toxicant/zinc reagent compositional range whereas the compositions of runs 2 and 4 were on the lower end of the desired compositional range.

What is claimed is:

1. A marine antifouling composition comprising, in admixture, an epoxy resin vehicle, having a molecular weight in the range of about 340 to less than about 8,000, an amine-type curing agent, a finely-divided zinc reagent selected from the group consisting of zinc having an average particle size diameter of less than 15 microns, and zinc oxide having an average particle size diameter ranging from about 0.2 to 2.0 microns, and an organometal toxicant selected from the group consisting of 10-phenoxarsine compounds, 5-hydro-10-substituted phenarsazines compounds, triphenarsazine chloride, and organotin toxicants possessing the general formulae: $(R)_3SnX$ and $[(R)_3Sn]_2Y$ wherein R is the same or different monovalent organic moiety selected from the group consisting of alkyl radicals having from 1 to 8 carbon atoms, phenyl radicals, and monovalent aralkyl radicals having from 7 to 12 carbon atoms, X is selected from the group consisting of halogen atoms, hydroxyl radicals, ether radicals having the formula —OR, wherein R is as defined above, hydrogen radicals, nitrate radicals, and organic ester radicals and Y is selected from the group consisting of oxygen atoms, sulfur atoms and aliphatic and aromatic diester functions having the general formula —OOCR$_2$COO— wherein $R_2$ is selected from the group consisting of phenylene radicals and saturated and unsaturated alkylene radicals having from 2 to 10 carbon atoms, the volume ratio of said organometallic toxicant to said zinc reagent varying from about 0.75 to 1.4 and the volume concentration of organometal toxicant and zinc reagent to epoxy resin, amine-type curing agent, organometal toxicant and zinc reagent varying from about 55 to 75%.

2. The coating composition of claim 1 wherein said 10-phenoxarsine compounds have the general formulae:

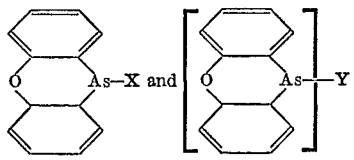

wherein X is selected from the group consisting of halogen atoms, thiocyanato radicals, alkyl radicals having from 1 to 6 carbon atoms and phenyl radicals and Y is selected from the group consisting of oxygen and sulfur atoms and said 5-hydro-10-substituted phenarsazine compounds have the general formula:

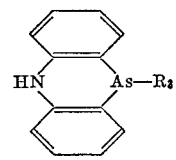

wherein $R_3$ is a cyanide radical, a thiocyanato radical, a $C_1$ to $C_4$ alkoxy radical, a dimethylthiocarbamoyl radical, an ethylxanthogenyl radical, a $C_1$ to $C_4$ thioalkenyl radical or a halogen atom.

3. The composition of claim 1 wherein said organometal toxicant possesses the general formula $(R)_3SnX$ wherein R is an alkyl radical having from 1 to 8 carbon atoms and X is a halogen atom.

4. The composition of claim 1 wherein said organometal toxicant is 10,10'-oxybisphenoxarsine.

5. The coating composition of claim 1 wherein the volume ratio of organometal toxicant to zinc reagent varies from about 0.8 to 1.0.

6. The coating composition of claim 1 wherein said amine-type curing agent is a polyamide.

7. A marine antifouling composition comprising, in admixture, an epoxy resin, said resin having a molecular weight in the range of from about 340 to 3,000 an amine-type curing agent, zinc dust having an average particle size diameter of less than about 15 microns, and an organometal toxicant selected from the group consisting of 10,10'-oxybisphenoxarsine and an organotin composition having the general formula $R_3SnX$ wherein R is an alkyl radical having from 1 to 8 carbon atoms and X is a halogen atom, the volume ratio of organometal toxicant to zinc dust ranging from about 0.8 to 1.0 and the volume concentration of zinc dust and organometal toxicant to epoxy to resin, amine-type curing agent, zinc dust and organometal toxicant ranging from about 55 to 75%.

8. The composition of claim 7 wherein R is an alkyl radical having from 2 to 4 carbon atoms.

9. The coating composition of claim 7 wherein said organometal toxicant is tri-n-butyl tin fluoride.

10. The coating composition of claim 7 wherein said organometal toxicant is 10,10'-oxybisphenoxarsine.

11. The coating composition of claim 7 wherein said curing agent is a polyamide.

12. A marine antifouling composition comprising, in admixture, an epoxy resin having a molecular weight in the range of from about 340 to less than about 8,000, an amine type curing agent, zinc dust having an average particle size of less than about 15 microns, an organometal toxicant consisting of 10,10′-oxybisphenoxarsine and an organotin composition having the general formula $R_3SnX$ wherein R is an alkyl radical having from 1 to 8 carbon atoms and X is a halogen atom, the volume ratio of organometal toxicant to zinc dust ranging from about 0.8 to 1.0 and the volume concentration of zinc dust and organometal toxicant to epoxy resin, amine-type curing agent, zinc dust and organometal toxicant ranging from about 55 to 75%.

13. The composition of claim 1 wherein the zinc reagent is zinc oxide having an average particle size diameter of from about .5 to 1.0 micron.

References Cited
UNITED STATES PATENTS

| | | | |
|---|---|---|---|
| 2,533,744 | 12/1950 | Skinner | 106—15 AF |
| 3,199,990 | 8/1965 | Taylor | 106—15 AF |
| 3,228,830 | 1/1966 | McFadden et al. | 106—15 AF |
| 3,426,473 | 2/1969 | Cardarelli et al. | 106—15 AF |

ALLAN LIEBERMAN, Primary Examiner

S. L. FOX, Assistant Examiner

U.S. Cl. X.R.

106—15 AF